US011421743B2

(12) United States Patent
Shinoda et al.

(10) Patent No.: US 11,421,743 B2
(45) Date of Patent: Aug. 23, 2022

(54) CONSTANT-VELOCITY UNIVERSAL JOINT

(71) Applicants: TOYOTA JIDOSHA KABUSHIKI KAISHA, Toyota (JP); JTEKT Corporation, Osaka (JP)

(72) Inventors: Yoshitaka Shinoda, Nagakute (JP); Koji Matsumoto, Nisshin (JP); Masahito Ikeo, Kariya (JP); Kimio Hibi, Ogaki (JP); Yoshinari Sakai, Takahama (JP)

(73) Assignees: TOYOTA JIDOSHA KABUSHIKI KAISHA, Toyota (JP); JTEKT Corporation, Osaka (JP)

( * ) Notice: Subject to any disclaimer, the term of this patent is extended or adjusted under 35 U.S.C. 154(b) by 328 days.

(21) Appl. No.: 16/680,892

(22) Filed: Nov. 12, 2019

(65) Prior Publication Data

US 2020/0149593 A1    May 14, 2020

(30) Foreign Application Priority Data

Nov. 14, 2018   (JP) .............................. JP2018-214223

(51) Int. Cl.
*F16D 3/223*    (2011.01)
*F16D 3/2237*   (2011.01)
*F16D 3/224*    (2011.01)

(52) U.S. Cl.
CPC .......... *F16D 3/2237* (2013.01); *F16D 3/224* (2013.01); *F16D 2003/22309* (2013.01); *Y10S 464/906* (2013.01)

(58) Field of Classification Search
CPC ................... F16D 3/2237; F16D 3/224; F16D 2003/22309; F16D 3/223; Y10S 464/906

USPC ........................................................ 464/145
See application file for complete search history.

(56) References Cited

U.S. PATENT DOCUMENTS

| 8,216,075 | B2* | 7/2012 | Weckerling ........... F16D 3/2233 |
| | | | 464/145 |
| 2004/0137991 | A1 | 7/2004 | Weckerling |
| 2014/0206463 | A1 | 7/2014 | Gremmelmaier et al. |
| 2019/0309800 | A1* | 10/2019 | Kashiwagi ............ F16D 3/2237 |
| 2019/0383330 | A1* | 12/2019 | Mondragon-Parra ....................... F16D 3/2237 |

FOREIGN PATENT DOCUMENTS

| CN | 103946571 A | 7/2014 |
| JP | 2004-169915 A | 6/2004 |
| JP | 2007255463 A | 10/2007 |
| JP | 2014525552 A | 9/2014 |

* cited by examiner

*Primary Examiner* — Greg Binda
(74) *Attorney, Agent, or Firm* — Hunton Andrews Kurth LLP (57) ABSTRACT

A constant-velocity universal joint including a generally cup-shaped outer joint member and an inner joint member that cooperate with each other to define first and second groove portions. A pinch angle by which a ball is pinched in the first groove portion is open toward an opening end of the outer joint member. A pinch angle by which the ball is pinched in the second groove is open toward a bottom wall of the outer joint member. An absolute value of the pinch angle in the first groove portion is larger than an absolute value of the pinch angle in the second groove portion in a reference state in which centerlines of the outer joint member and the inner joint member lie in a straight line.

8 Claims, 9 Drawing Sheets

PRIOR ART

FIG.16

PRIOR ART

FIG.17

PRIOR ART

CONSTANT-VELOCITY UNIVERSAL JOINT

This application claims priority from Japanese Patent Application No. 2018-214223 filed on Nov. 14, 2018, the disclosure of which is herein incorporated by reference in its entirety.

FIELD OF THE INVENTION

The present invention in general relates to a constant-velocity universal joint, more particularly, to an improvement of a constant-velocity universal joint in which two types of groove portions, i.e., first and second groove portions are alternately arranged about a centerline, wherein a radial distance between an outer track groove and an inner track groove, which cooperate to pinch a ball, is increased in one of axially opposite directions in the first groove portion and is increased in the other of the axially opposite directions in the second groove portion.

BACKGROUND OF THE INVENTION

There is known a constant-velocity universal joint including (a) a generally cup-shaped outer joint member having a plurality of outer track grooves provided in an inner circumferential surface thereof, (b) an inner joint member having a plurality of inner track grooves provided in an outer circumferential surface thereof, and disposed inside the outer joint member; (c) a plurality of balls interposed between the outer track grooves and the inner track grooves, so as to transmit a torque between the outer joint member and the inner joint member; and (e) a generally annular-shaped cage disposed between the outer joint member and the inner joint member, and having a plurality of pockets holding therein the balls. The known constant-velocity universal joint is widely used as, for example, a drive-force transmitting device for as a front wheel axle of a vehicle and a rotation transmitting device for various kinds of machines other than a vehicle. As a kind of the constant-velocity universal joint, there is proposed a constant-velocity universal joint in which the outer track grooves and the inner track grooves cooperate to define a plurality groove portions, such that each of the balls is disposed in a corresponding one of the groove portions and is pinched between a corresponding one of the outer track grooves and a corresponding one of the inner track grooves, wherein each of the balls is in contact at outer and inner contact points with a corresponding one of the outer track grooves and a corresponding one of the inner track grooves, respectively, wherein an outer tangent plane that is tangent at the outer contact point and an inner tangent plane that is tangent at the inner contact point cooperate with each other to define a pinch angle. The groove portions include at least one first groove portion in which a radial distance between a corresponding one of the outer track grooves and a corresponding one of the inner track grooves in a radial direction of the outer joint member is generally increased in a direction toward an opening end of the outer joint member in a reference state in which centerlines of the outer joint member and the inner joint member lie in a straight line with a joint angle defined by the centerlines being 0 degree. The groove portions include, in addition to the at least one first groove portion, at least one second groove portion in which a radial distance between a corresponding one of the outer track grooves and a corresponding one of the inner track grooves in the radial direction is generally reduced in the direction toward the opening end of the outer joint member in the reference state. Further, in the reference state, the at least one first groove portion and the at least one second groove portion are alternately arranged about the centerlines, and each of the at least one first groove portion and a corresponding one of the at least one second groove portion are located in respective positions that are symmetrical with respect to the centerlines (see JP2004-169915A). It is noted that the outer joint member and the inner joint member are also known as "outer race" and "inner race", respectively.

SUMMARY OF THE INVENTION

In the above-described constant-velocity universal joint, each ball receives a pressing force dependent on the pinch angle by which the ball is pinched by the outer and inner track grooves. Thus, when the joint angle is to be changed (i.e., when the joint is to be bent and is to be returned from being bent), the cage is smoothly pivoted owing to the pressing force applied to at least one of the balls, and the other ball or balls (to which the pressing force is not applied) are moved by the cage, so that the joint angle is smoothly changed. However, depending on the joint angle and a phase of the constant-velocity universal joint about the centerlines upon change of the joint angle, the pressing force applied to the balls cannot be obtained sufficiently, so that there is a possibility of generation of noise or the like caused by, for example, resistance to pivot movement of the cage and delay of the pivot movement of the cage.

Figure 8:
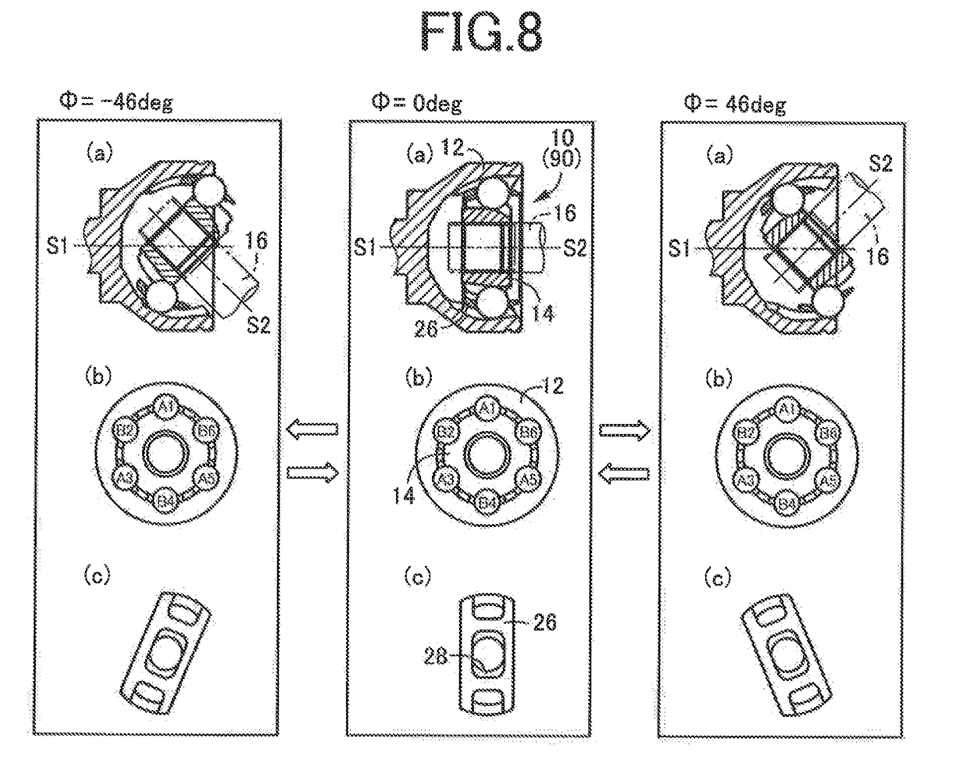
FIG. 8 is a set of views showing cases in which a shaft of the inner joint member of the constant-velocity universal joint of FIG. 1 is to be returned from being pivoted upwardly (toward the first groove portion) and downwardly (toward the second groove portion)
Figure 15:
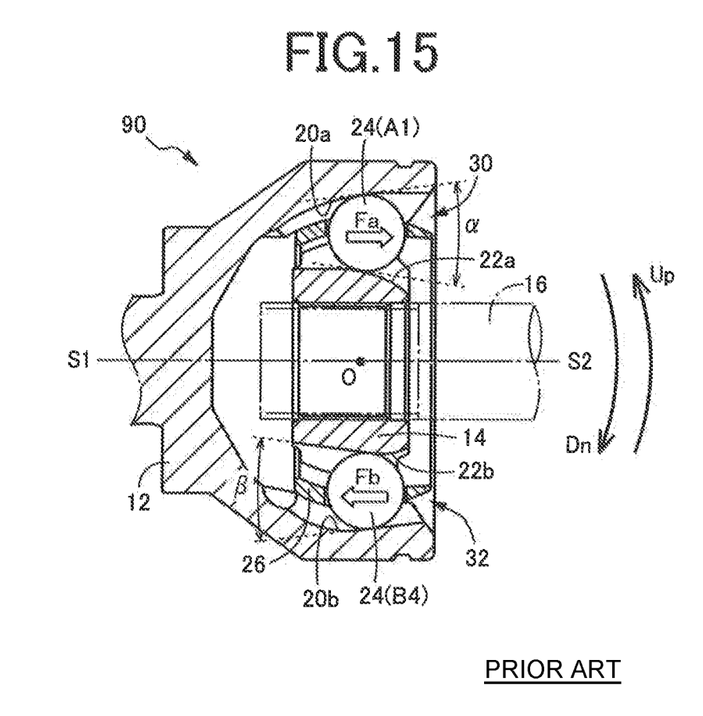
FIG. 15 is a cross sectional view corresponding to FIG. 7 that shows the constant-velocity universal joint (as the embodiment of the invention) of FIG. 1, and explaining the conventional constant-velocity universal joint in which the absolute values of the pinch angles $\alpha$, $\beta$ are equal to with each other.
Figure 16:
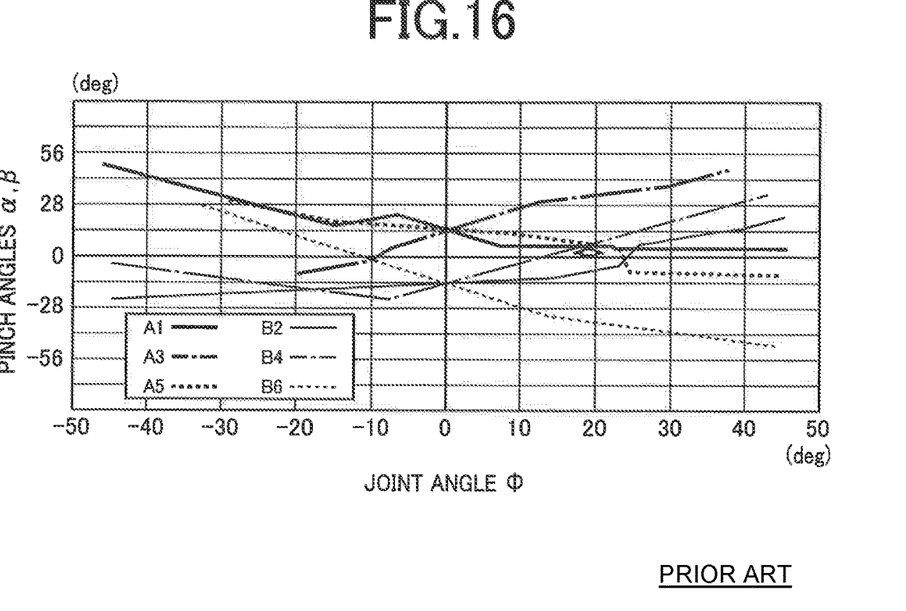
FIG. 16 is a view corresponding to FIG. 9 that relates to the constant-velocity universal joint (as the embodiment of the invention) of FIG. 1, and showing characteristics of changes of the pinch angles $\alpha$, $\beta$ of the six balls A1, A3, A5, B2, B4, B6 (that are defined as in FIG. 8), in relation with the joint angle $\Phi$ in the conventional constant-velocity universal joint of FIG. 15.

FIG. 15 is a cross sectional view of a conventional constant-velocity universal joint 90 that includes an outer joint member 12, an inner joint member 14, a cage 26 and six balls 24. A first groove portion 30 is located right above centerlines S1, S2, while a second groove portion 32 is located right below the centerlines S1, S2. In the first groove portion 30, the pinch angle $\alpha$ is open rightward (toward an opening end of the outer joint member 12), namely, a radial distance between an outer track groove 20a and an inner track groove 22a in a radial direction of the outer joint member 12 is generally increased in a rightward direction toward the opening end of the outer joint member 12. In the second groove portion 32, the pinch angle $\beta$ is open leftward (toward a bottom wall of the outer joint member 12), namely, a radial distance between an outer track groove 20b and an inner track groove 22b in the radial direction is generally increased in a leftward direction toward the bottom wall of the outer joint member 12. The centerline S1 is an axis of the outer joint member 12, while the centerline S2 is an axis of the inner joint member 14. The first and second groove portions 30, 32 are alternately arranged about the centerlines S1, S2 and equi-angularly spaced apart from each other. For distinguishing the six balls 24 from one another, the balls 24 disposed in the respective three first groove portions 30 are referred to as balls A1, A3, A5, and the balls 24 disposed in the respective three second grooves 32 are referred to as balls B2, B4, B6, as shown in FIG. 8. In this arrangement, as shown in FIG. 15, the ball A1 receives a pressing force Fa acting in the rightward direction, while the ball B4 receives a pressing force Fb acting in the leftward direction. Therefore, when a shaft 16 of the inner joint member 14 is to be pivoted relative to the outer joint member 12 downwardly as indicated by arrow Dn within a plane (that corresponds to drawing sheet of FIG. 15) containing the centers of the respective balls A1 and B4, namely, about a pivot axis perpendicular to the plane, the cage 26 is smoothly pivoted by movements of the balls A1, B4 owing to the pressing forces Fa, Fb applied to the respective balls A1, B4. However, when the shaft 16 of the inner joint member 14 is to be pivoted relative to the outer joint member 12 upwardly as indicated by arrow Up, the pressing force Fa applied to the ball A1 acts in a direction opposite to a direction in which the ball A1 is to be moved, and the pressing force Fb applied to the ball B4 acts in a direction opposite to a direction in which the ball B4 is to be moved, so that the cage 26 cannot be pivoted only by the balls A1, B4. The balls A1, B4 could be moved by forces based on frictions, for example, but the forces based on the frictions are not enough. The six balls A1, A3, A5, B2, B4, B6 (that will be referred simply to as "balls A, B" where the six balls are not be particularly distinguished from one another) are arranged about the centerlines S1, S2, and the pinch angles α, β of the balls A, B are changed depending on the joint angle Φ, as shown in FIG. 16. Since the pressing forces Fa, Fb are changed with changes of the pinch angles α, β of the balls A, B, it is necessary to study a magnitude and a direction of each of the pressing forces Fa, Fb which is based on a corresponding one of the pinch angles α, β of a corresponding one of all of the six balls A1, A3, A5, B2, B4, B6.

FIG. 16 shows changes of the pinch angles α, β depending on the joint angle Φ when the shaft 16 of the inner joint member 14 is pivoted relative to the outer joint member 12 upwardly and downwardly within the plane containing the centers of the respective balls A1, B4 in an arrangement in which the pinch angle α is set to 14 degrees and the pinch angle β is set to −14 degrees in the reference state (i.e., state shown in FIG. 15) with the joint angle Φ being 0 degree. When the shaft 16 of the inner joint member 14 is pivoted upwardly (toward the first groove portion 30), the joint angle Φ takes a positive value, for example, Φ=46 degrees in a case shown in right-side view of FIG. 8. When the shaft 16 of the inner joint member 14 is pivoted downwardly (toward the second groove portion 32), the joint angle Φ takes a negative value, for example, Φ=−46 degrees in a case shown in left-side view of FIG. 8. Further, regarding the sign of the pinch angles α, β, the pinch angle takes a positive value when it opens toward the opening end of the outer joint member 12 (in the rightward direction as seen in FIG. 15), and takes a negative value when it opens toward the bottom wall of the outer joint member 12 (in the leftward direction as seen in FIG. 15). In this arrangement, when the joint angle Φ is in the vicinity of 20 degrees, the pinch angle α of the ball A1, which is one of the three balls A1, B2, B6 located on an upper side of the centerline S1, is positive, while the pinch angles β of the balls B2, B6, which are the other of the three balls A1, B2, B6 located on the upper side of the centerline S1, are negative. Further, the pinch angles α, β of the balls A3, A5, B4, which are located on a lower side of the centerline S1, are all positive. Therefore, when the constant-velocity universal joint 90 is to be placed back into the reference state after the shaft 16 of the inner joint member 14 has been pivoted upwardly to the joint angle Φ of 20 degrees, only the ball A1 receives the pressing force Fa acting in the returning direction, and the pinch angle α of the ball A1 is so small that the pressing force Fa applied to the ball A1 is not large enough, so that there is a possibility of generation of noise or the like caused by, for example, resistance to pivot movement of the cage 26 and delay of the pivot movement of the cage 26. It is noted that a value or range of the joint angle Φ, which is to be problematic, varies depending on characteristics of changes of the pinch angles α, β in relation with the joint angle Φ, namely, depending on, for example, shapes of bottoms of the track grooves 20a, 20b, 22a, 22b. Such bending and return from the bending at a certain phase is executed, for example, at a test or the like made in a factory, and could be executed also in an actual drive of a vehicle, for example, when a direction of steerable wheels is changed during stop of the vehicle, where the constant-velocity universal joint is provided in a front wheel axle of the vehicle.

The present invention was made in view of the background art described above. It is therefore an object of the present invention to provide a constant-velocity universal joint in which two types of groove portions, i.e., first and second groove portions are alternately arranged about a centerline, wherein a pinch angle by which a ball is pinched in the first groove portion is open in one of opposite directions while the pinch angle in the second groove portion is open in the other of the opposite directions, and wherein a cage can be further smoothly pivoted owing to pressing forces which are applied to the balls and which are dependent on the pinch angles.

The object indicated above is achieved according to the following aspects of the present invention.

According to a first aspect of the invention, there is provided a constant-velocity universal joint comprising: (a) a generally cup-shaped outer joint member having a plurality of outer track grooves provided in an inner circumferential surface thereof; (b) an inner joint member having a plurality of inner track grooves provided in an outer circumferential surface thereof, the inner joint member being disposed inside the outer joint member; (c) a plurality of balls interposed between the outer track grooves and the inner track grooves, so as to transmit a torque between the outer joint member and the inner joint member; and (d) a generally annular-shaped cage disposed between the outer joint member and the inner joint member, and having a plurality of pockets holding therein the balls. The outer track grooves and the inner track grooves cooperate to define a plurality groove portions, such that each of the balls is disposed in a corresponding one of the groove portions, wherein each of the balls, which is disposed in a corresponding one of the groove portions, is pinched between one of the outer track grooves and one of the inner track grooves that cooperate to define the corresponding one of the groove portions, and is also in contact at outer and inner contact points with the one of the outer track grooves and the one of the inner track grooves, respectively. An outer tangent plane that is tangent to each of the balls at the outer contact point and an inner tangent plane that is tangent to each of the balls at the inner contact point cooperate with each other to define a pinch angle at an intersection of the outer tangent plane and the inner tangent plane. The groove portions include three first groove portions in which a radial distance between a corresponding one of the outer track grooves and a corresponding one of the inner track grooves in a radial direction of the outer joint member is generally increased in a direction toward an opening end of the outer joint member in a reference state in which centerlines of the outer joint member and the inner joint member lie in a straight line with a joint angle defined by the centerlines being 0 degree. The groove portions include three second groove portions in which a radial distance between a corresponding one of the outer track grooves and a corresponding one of the inner track grooves in the radial direction is generally reduced in the direction toward the opening end of the outer joint member in the reference state. In the reference state, the three first groove portions and the three second groove portions are alternately arranged about the centerlines, and each of the three first groove portions and a corresponding one of the three second groove portions are located in respective positions that are symmetrical with respect to the centerlines. In the reference state, an absolute value of the pinch angle in the three first groove portions is larger than an absolute value of the pinch angle in the three second groove portions. The above-described pinch angle may be defined as an angle that is defined by two straight lines, wherein the two straight lines lie on the respective the above-described outer and inner tangent planes, and wherein the two straight lines are perpendicular to an intersection line of the above-described outer and inner tangent planes, and pass through the same point lying on the intersection line. Further, the above-described pinch angle may be defined also as an angle of intersection of outer and inner tangent lines in a cross section containing the centerlines of the outer and inner joint members in the reference state, wherein the outer tangent line is tangent to each of the balls at the outer contact point while the inner tangent line is tangent to each of the balls at the inner contact point. Where the outer contact point lies in a portion of the outer track groove which is defined by a straight line in the cross section and the inner contact point lies in a portion of the inner track groove which is defined by a straight line in the cross section, the pinch angle is an angle of intersection of these two straight lines.

According to a second aspect of the invention, in the constant-velocity universal joint according to the first aspect of the invention, in the reference state, the absolute value of the pinch angle in the at least one first groove portion is larger than the absolute value of the pinch angle in the at least one second groove portion by a range from 2 degrees to 10 degrees.

According to a third aspect of the invention, in the constant-velocity universal joint according to the first or second aspect of the invention, when the constant-velocity universal joint is bent within a plane containing one of the at least one first groove portion, the pinch angle in the one of the at least one first groove portion is maintained irrespective of the joint angle such that the radial distance in the one of the at least one first groove portion is generally increased in the direction toward the opening end of the outer joint member and such that the absolute value of the pinch angle in the one of the at least one first groove portion is larger than the absolute value of the pinch angle in the at least one second groove portion in the reference state.

According to a fourth aspect of the invention, in the constant-velocity universal joint according to any one of the first through third aspects of the invention, each of the outer track grooves of the at least one first groove portion and the at least one second groove portion has a bottom that includes a straight portion defined by a straight line in a cross section containing the centerline of the outer joint member, wherein the outer contact point lies in the straight portion of the bottom of each of the outer track grooves at least when the joint angle is not larger than 5 degrees, wherein each of the inner track grooves of the at least one first groove portion and the at least one second groove portion has a bottom that includes a straight portion defined by a straight line in a cross section containing the centerline of the inner joint member, and wherein the inner contact point lies in the straight portion of the bottom of each of the inner track grooves at least when the joint angle is not larger than 5 degrees.

According to a fifth aspect of the invention, in the constant-velocity universal joint according to any one of the first through fourth aspects of the invention, a total number of the groove portions is six or ten.

In the constant-velocity universal joint according to the first aspect of the invention, the absolute value of the pinch angle of the at least one first groove portion is larger than the absolute value of the pinch angle of the at least one second groove portion in the reference state, so that the pressing force applied to the ball by the pinch angle in the at least one first groove portion is made large. Therefore, even in a range of the joint angle in which a sufficiently large pressing force cannot be obtained by the pinch angle in the first groove portion in a conventional constant-velocity universal joint, the pressing force applied to the ball in the first groove portion is made sufficiently large whereby the cage can be smoothly pivoted by movement of the ball by the pressing force applied to the ball.

In the constant-velocity universal joint according to the second aspect of the invention, the absolute value of the pinch angle in the at least one first groove portion is larger than the absolute value of the pinch angle in the at least one second groove portion by a range from 2 degrees to 10 degrees in the reference state. Therefore, the pressing force applied to the ball in the first groove portion is made reliably large whereby the cage can be appropriately pivoted by movement of the ball by the pressing force applied to the ball.

In the constant-velocity universal joint according to the third aspect of the invention, when the constant-velocity universal joint is bent within the plane containing one of the at least one first groove portion, the pinch angle in the one of the at least one first groove portion is maintained irrespective of the joint angle, such that the value of the pinch angle in the one of the at least one first groove portion is positive, namely, the radial distance between a corresponding one of the outer track grooves and a corresponding one of the inner track grooves in the radial direction is generally increased in the direction toward the opening end of the outer joint member, and such that the absolute value of the pinch angle in the one of the at least one first groove portion is larger than the absolute value of the pinch angle in the at least one second groove portion in the reference state. Thus, irrespective of the joint angle, namely, throughout an entire range of the joint angle, the pressing force applied to the ball by the pinch angle in the above-described one of the at least one first groove portion is maintained relatively large. Therefore, the cage can be smoothly pivoted by movement of the ball by the pressing force depending on a bending direction.

In the constant-velocity universal joint according to the fourth aspect of the invention, each of the outer track grooves of the at least one first groove portion and the at least one second groove portion has a bottom that includes a straight portion defined by a straight line in the cross section containing the centerline of the outer joint member, wherein the outer contact point lies in the straight portion of the bottom of each of the outer track grooves at least in a small bending region, namely, at least when the joint angle is not larger than 5 degrees, wherein each of the inner track grooves of the at least one first groove portion and the at least one second groove portion has a bottom that includes a straight portion defined by a straight line in the cross section containing the centerline of the inner joint member, and wherein the inner contact point lies in the straight portion of the bottom of each of the inner track grooves at least in the small bending region. Therefore, a portion of each of the track grooves, which corresponds to the small bending region that, in general, overlaps with a normal region, can be machined easily with a high accuracy so that it is possible to appropriately obtain the pressing force depending on the pinch angle.

DETAILED DESCRIPTION OF PREFERRED EMBODIMENT

The constant-velocity universal joint of the present invention is applied to, for example, a drive-force transmitting device for an axle of front wheels as steerable wheels of a vehicle, and also a rotation transmitting device for various kinds of machines other than a vehicle. A maximum value of the joint angle (i.e., maximum angle value by which the joint can be bent) is preferably at least 30 degrees, and is more preferably at least 40 degrees. However, the maximum value of the joint angle may be smaller than 30 degrees. The total number of the balls, i.e., the total number of the groove portions consisting of the first and second groove portions is preferably six or ten, but may be 2+4n (where "n" represents a natural number not less than 1), such that each of the at least one first groove portion and a corresponding one of the at least one second groove portion are located in respective positions that are symmetrical with respect to the centerlines. It is noted that the natural number n may be also 0 (n=0), namely, the total number of the groove portions may be two.

An absolute value of the pinch angle of the at least one first groove portion is larger than an absolute value of the pinch angle of the at least one second groove portion, preferably, by 2-10 degrees, and more preferably, by 4-8 degrees in the reference state. If the difference is less than 2 degrees, it would be hard to obtain an advantage owing to the difference. However, the difference may be less than 2 degrees as long as a certain degree of advantage can be obtained. If the difference is more than 10 degrees, the posture of the cage could be unstable. However, the difference may be more than 10 degrees as long as there is no issue such as lack of stability in the posture of the cage. It is preferable that the pinch angle, which is defined between the outer and inner track grooves, is open substantially evenly radially outwardly and radially inwardly. However, the pinch angle may be open mainly radially outwardly or mainly radially inwardly. The absolute value of the pinch angle of the at least one second groove portion is preferably, for example, in a range from about 10 degrees to 20 degrees in the reference state. The absolute value of the pinch angle of the at least one first groove portion is larger than the absolute value of the pinch angle of the at least one second groove portion in the reference state, and is preferably, for example, in a range from about 15 degrees to 25 degrees in the reference state.

Each of the outer and inner track grooves constituting the at least one first groove portion preferably has a bottom shape in the axial direction such that, when the constant-velocity universal joint is bent within a plane containing one of the at least one first groove portion, the absolute value of the pinch angle of the at least one first groove portion is held larger than the absolute value of the pinch angle of the at least one second groove portion in the reference state, irrespective of the joint angle. However, the absolute value of the pinch angle of the at least one first groove portion in a certain region of the joint angle may be smaller than the absolute value of the pinch angle of the at least one second groove portion in the reference state, as long as the absolute value of the pinch angle of the at least one first groove portion in the reference state is larger than the absolute value of the pinch angle of the at least one second groove portion in the reference state.

A bottom of each of the outer and inner track grooves constituting the at least one first groove portion preferably includes a straight portion defined by a straight line in a cross section containing the centerline of the outer or inner joint member, such that the outer or inner contact point lies in the straight portion, at least in the small bending region, namely, preferably when the joint angle is not smaller than −5 degrees and not larger than +5 degrees, more preferably, when the joint angle is not smaller than −8 degrees and not larger than +8 degrees. However, the bottom of each of the outer and inner track grooves may include a non-straight portion defined by a curved line such as an arcuate line in the cross section, such that the outer or inner contact point lies in the non-straight portion in the small bending region including 0 degree of the joint angle. The straight portion of the bottom of each of the outer and inner track grooves is inclined with respect to the centerline such that a desired pinch angle is defined.

Hereinafter, a preferred embodiment of the invention will be described in detail with reference to the accompanying drawings. The figures of the drawings are simplified or deformed as needed, and each portion is not necessarily precisely depicted in terms of dimension ratio, shape, etc.

Embodiment

Figure 1:
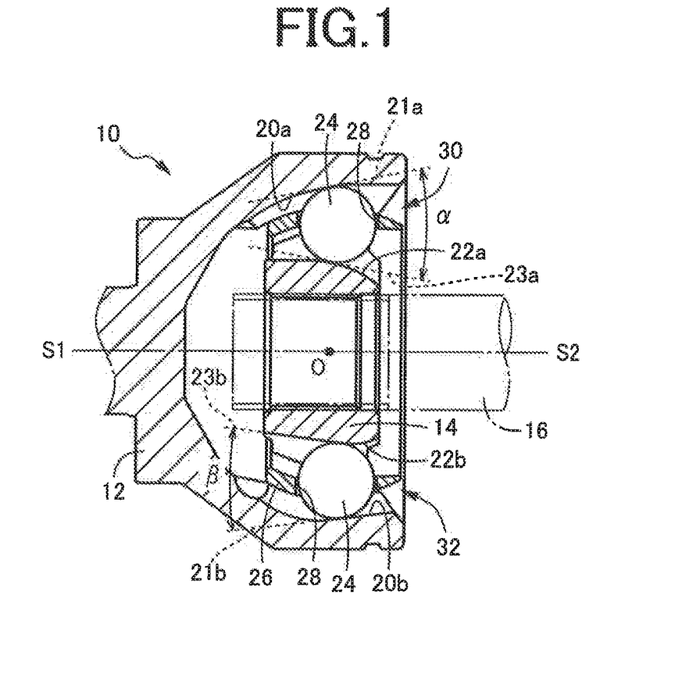
FIG. 1 is a cross sectional view of a constant-velocity universal joint constructed according to an embodiment of the present invention, wherein the cross sectional view is taken in a plane containing an axis of the constant-velocity universal joint.
Figure 2:
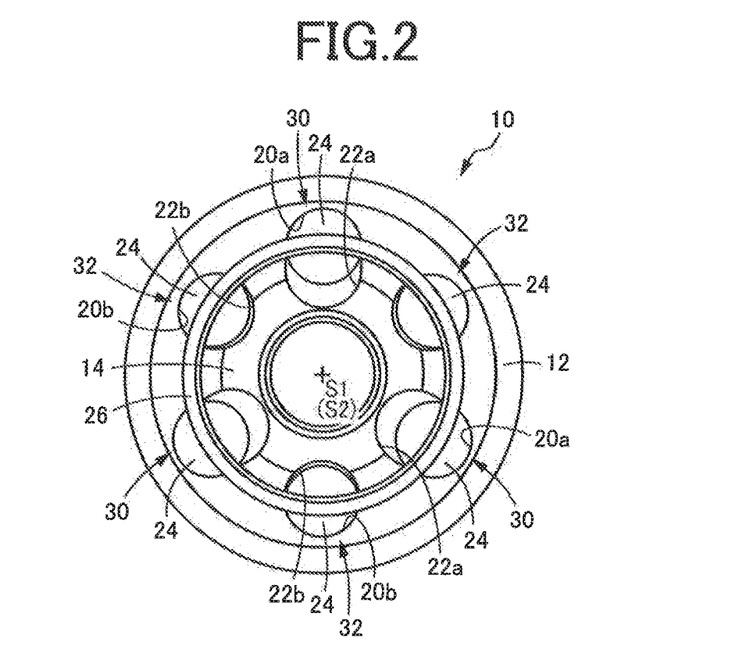
FIG. 2 is a side view of the constant-velocity universal joint of FIG. 1, wherein the side view is as seen from right side of FIG. 1.

FIG. 1 is a cross sectional view of a constant-velocity universal joint 10 constructed according to an embodiment of the present invention, wherein the cross sectional view is taken in a plane containing an axis of the constant-velocity universal joint 10. FIG. 2 is a side view that is seen from right side of FIG. 1. This constant-velocity universal joint 10 is to be used, for example, for an axle of front wheels as steerable wheels of a vehicle, and includes an outer joint member 12 and an inner joint member 14 to which a shaft 16 is connected through splines or the like in a drive-force transmittable manner. The views of FIGS. 1 and 2 show a reference state of the constant-velocity universal joint 10 in which a centerline S1 of the outer joint member 12 and a centerline S2 of the inner joint member 14 are aligned with each other, namely, lie in a straight line with a joint angle Φ being 0 degree. In this constant-velocity universal joint 10, a maximum value of the joint angle Φ (i.e., maximum angle value by which the joint 10 can be bent) is at least 40 degrees, and is about 46 degrees in the present embodiment. The joint angle Φ is an angle of intersection of the centerline S1 and the centerline S2. The joint angle Φ is 0 degree in the reference state in which the centerlines S1, S2 lie in a straight line.

The outer joint member 12 is a generally cup-shaped member (semi-spherical shaped member), and has a plurality of outer track grooves 20 provided in its inner circumferential surface. The outer track grooves 20 are arranged about the centerline S1 and are substantially equi-angularly spaced apart from each other. The outer track grooves 20 consist of a plurality of first outer track grooves 20a and a plurality of second outer track grooves 20b. In the present embodiment, the outer track grooves 20 consist three first outer track grooves 20a and three second outer track grooves 20b such that the first and second outer track grooves 20a, 20b are alternately arranged about the centerline S1. It is noted that the first and second outer track grooves 20a, 20b will be simply referred to as outer track grooves 20 unless they are to be distinguished. Meanwhile, the inner joint member 14 is disposed radially inside the generally cup-shaped outer joint member 12, and has a plurality of inner track grooves 22 provided in its outer circumferential surface. The inner track grooves 22 are arranged about the centerline S2 and are substantially equi-angularly spaced apart from each other. The inner track grooves 22 consist of a plurality of first inner track grooves 22a and a plurality of second inner track grooves 22b. In the present embodiment, the inner track grooves 22 consist three first inner track grooves 22a and three second inner track grooves 22b such that the first and second inner track grooves 22a, 22b are alternately arranged about the centerline S2. It is noted that the first and second inner track grooves 22a, 22b will be simply referred to as inner track grooves 22 unless they are to be distinguished.

Each of the first outer track grooves 20a is provided to be opposed to a corresponding one of the first inner track grooves 22a in a radial direction of the constant-velocity universal joint 10, such that a ball 24 is interposed between the first outer and inner track grooves 20a, 22a that are opposed to each other in the radial direction, so as to transmit a torque between the outer and inner joint members 12, 14 through the ball 24 interposed between the mutually opposed first outer and inner track grooves 20a, 22a. The ball 24 is pinched between the first outer and inner track grooves 20a, 22a, and is in contact at outer and inner contact points with the first outer and inner track grooves 20a, 22a, respectively. Similarly, each of the second outer track grooves 20b is provided to be opposed to a corresponding one of the second inner track grooves 22b in a radial direction of the constant-velocity universal joint 10, such that the ball 24 is interposed between the second outer and inner track grooves 20b, 22b that are opposed to each other in the radial direction, so as to transmit the torque between the outer and inner joint members 12, 14 through the ball 24 interposed between the mutually opposed second outer and inner track grooves 20b, 22b. The ball 24 is pinched between the second outer and inner track grooves 20b, 22b, and is in contact at outer and inner contact points with the second outer and inner track grooves 20b, 22ba, respectively. In an annular-shaped space defined between the outer and inner joint members 12, 14, an annular-shaped cage 26 is provided to be pivotable about a joint center O. The annular-shaped cage 26 has six pockets (openings) 28 that are provided to be substantially equi-angularly spaced apart from each other, such that the balls 24 are held in the respective pockets 28. The cage 26 has a spherical-shaped outer circumferential surface, and is held by the outer joint member 12 with the spherical-shaped outer circumferential surface being slidably fitted in the inner circumferential surface of the outer joint member 12.

Each of the first outer track grooves 20a and the corresponding one of the first inner track grooves 22a, which are opposed to each other in the radial direction, constitute a first groove portion 30, while each of the second outer track grooves 20b and the corresponding one of the second inner track grooves 22b, which are opposed to each other in the radial direction, constitute a second groove portion 32. The first and second groove portions 30, 32 are alternately arranged about the centerlines S1, S2. In the present embodiment in which the total number of the groove portions 30, 32 is six, each of the first groove portions 30 and a corresponding one of the second groove portions 32 are located in respective positions that are symmetrical with respect to the centerlines S1, S2, as shown in FIG. 2.

Figure 7:
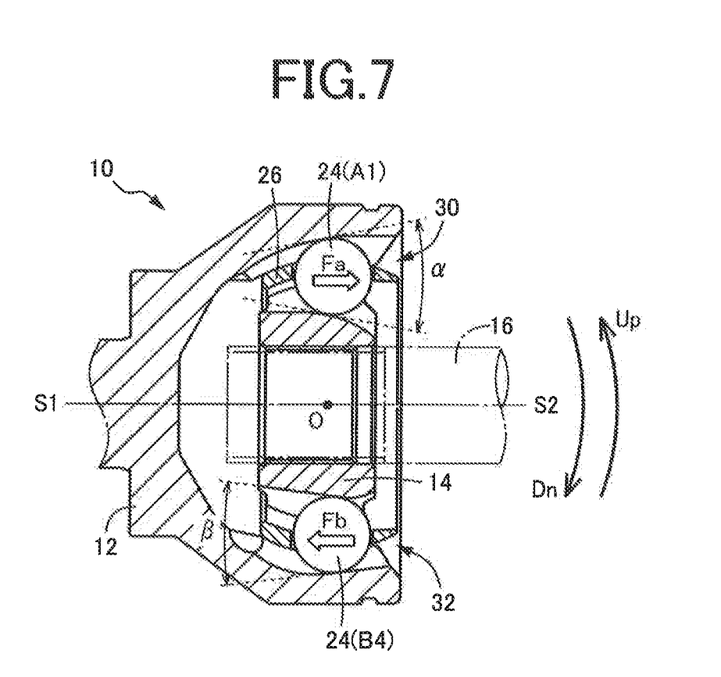
FIG. 7 is a view for explaining a pressing force Fa applied to a ball A1, based on a pinch angle $\alpha$ in a first groove portion, and a pressing force Fb applied to a ball B4, based on a pinch angle $\beta$ in a second groove portion, in the constant-velocity universal joint of FIG. 1.
Figure 9:
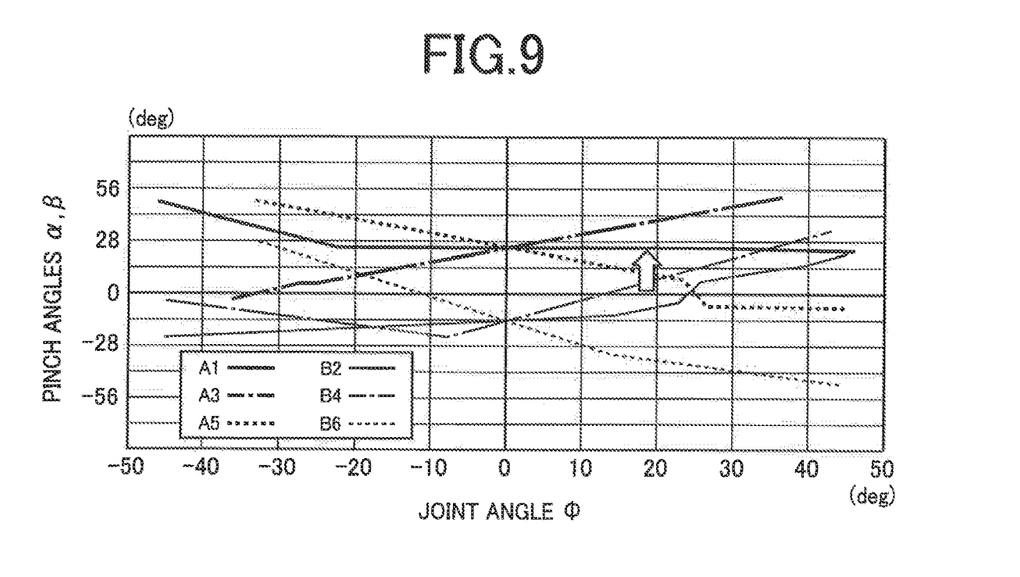
FIG. 9 is a view showing characteristics of changes of the pinch angles $\alpha$, $\beta$ of the six balls A1, A3, A5, B2, B4, B6 shown in FIG. 8, in relation with the joint angle $\Phi$.

In the reference state shown in FIGS. 1 and 2, a pinch angle α in each first groove portion 30, namely, the pinch angle α, by which the ball 24 is pinched between the first outer and inner track grooves 20a, 22a, is a positive value so as to open toward an opening end of the cup-shaped outer joint member 12 (rightward as seen in FIG. 1). That is, in each first groove portion 30, a radial distance between the first outer and inner track grooves 20a, 22a in a radial direction of the outer joint member 12 is generally increased in a direction toward the opening end of the outer joint member 12 in the reference state. The pinch angle α is defined as an angle of intersection of an outer tangent plane 21a that is tangent to the ball 24 at the above-described outer contact point and an inner tangent plane 23a that is tangent to the ball 24 at the above-described inner contact point. That is, the pinch angle α is an angle of the inner tangent plane 23a relative to the outer tangent plane 21a. Meanwhile, a pinch angle β in each second groove portion 32, namely, the pinch angle β, by which the ball 24 is pinched between the second outer and inner track grooves 20b, 22b, is a negative value so as to open toward a bottom wall of the cup-shaped outer joint member 12 (leftward as seen in FIG. 1). That is, in each second groove portion 32, a radial distance between the second outer and inner track grooves 20b, 22b in the radial direction is generally reduced in the direction toward the opening end of the outer joint member 12 in the reference state. The pinch angle β is defined as an angle of intersection of an outer tangent plane 21b that is tangent to the ball 24 at the above-described outer contact point and an inner tangent plane 23b that is tangent to the ball 24 at the above-described inner contact point. That is, the pinch angle β is an angle of the inner tangent plane 23b relative to the outer tangent plane 21b. In the reference state, an absolute value of the pinch angle α is larger than an absolute value of the pinch angle β by 2-10 degrees. In the present embodiment, the absolute value of the pinch angle α is larger than the absolute value of the pinch angle β by 8 degrees. Specifically, the pinch angle α is in a range between 15 degrees and 25 degrees, and is about 22 degrees, for example. The pinch angle β is in a range of between −10 degrees and −20 degrees, and is about −14 degrees, for example. The pinch angle α is changed with change of the joint angle Φ. In the present embodiment, as shown in FIG. 7, when the constant-velocity universal joint 10 is bent within a plane containing the first groove portion 30, the absolute value of the pinch angle α is always larger than the absolute value (14 degrees) of the pinch angle β in the reference state, irrespective of the joint angle Φ. As shown in FIG. 9 in which the pinch angle α of the ball 24 (A1) in one of the first groove portions 30 that is located in an upper portion of FIG. 1 is represented by thick solid line, the pinch angle α of the ball 24 (A1) is larger than 14 degrees and is kept to be not smaller than about 20 degrees throughout an entire range of the joint angle Φ. That is, bottoms of the first outer and inner track grooves 20a, 22a in the axial cross section, which define to the pinch angle α, have respective shapes that cooperate to keep the pinch angle α not smaller than about 20 degrees, irrespective of the joint angle Φ.

Figure 3:
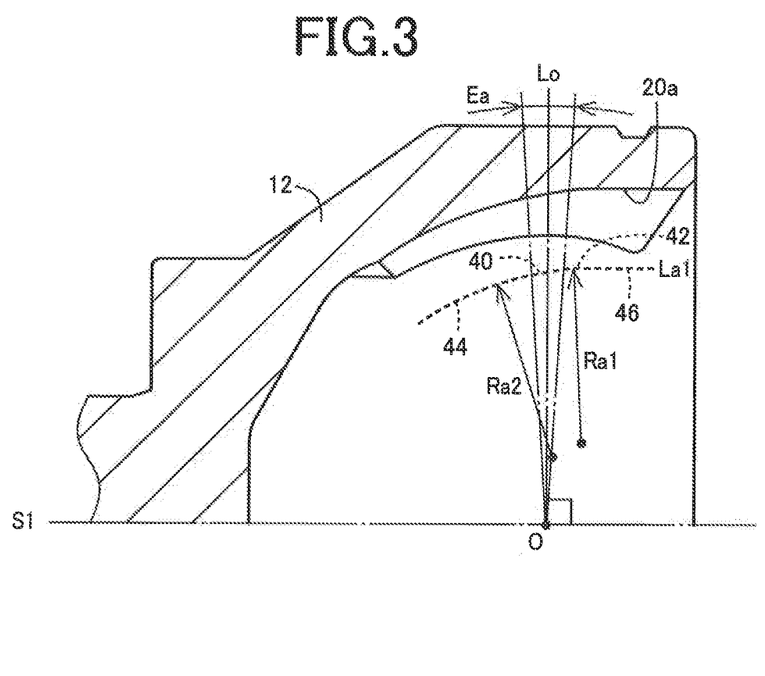
FIG. 3 is a cross sectional view of an outer joint member of the constant-velocity universal joint of FIG. 1, particularly, a portion of a first outer track groove of the outer joint member, for explaining a shape of a bottom of the first outer track groove in its longitudinal direction.

FIG. 3 is a view for specifically explaining a shape of the bottom of the first outer track groove 20a in the axial cross section. In FIG. 3, broken line indicates a ball locus La1 that is a movement path along which a center of the ball 24 is to be moved. The shape of the bottom of the first outer track groove 20a is dependent on the ball locus La1. The ball locus La1 includes an inclined straight portion 40, arcuate portions 42, 44 and a parallel straight portion 46. The inclined straight portion 40 corresponds to a normal region (small bent region) Ea in which the joint angle Φ is not larger than 7 degrees (namely, −7 degrees≤Φ≤+7 degrees). The arcuate portions 42, 44 are smoothly connected to respective opposite ends of the inclined straight portion 40, and have respective radii Ra1, Ra2. The parallel straight portion 46 is parallel with the centerline S1, and is smoothly connected to one of opposite ends of the arcuate portion 42, which is on right side in FIG. 3, namely, which is on the side of the opening end of the cup-shaped outer joint member 12. The normal region Ea corresponds to a range of 7 degrees, and consist of two regions, wherein one of the two regions corresponds to a range of 3.5 degrees located on one of opposite sides of a perpendicular line Lo passing through the joint center O, and the other of the two regions corresponds to another range of 3.5 degrees located on the other of the opposite sides of the perpendicular line Lo. The inclined straight portion 40 defines the pinch angle α in the reference state in which the joint angle Φ is 0 degree. In the present embodiment, the inclined straight portion 40 is inclined radially outwardly by about 11 degrees corresponding to α/2 (i.e., a half of the pinch angle α) such that the inclined straight portion 40 becomes more distant from the centerline S in a direction toward the opening end of the cup-shaped outer joint member 12. Both of the radii Ra1, Ra2 of the respective arcuate portions 42, 44 are smaller than a radial distance of the ball locus La1 from the centerline S1. The bottom of the first outer track groove 20a has a radial dimension that is larger than the ball locus La1 by a radius of the ball 24. It is noted that the second outer track groove 20b, which is disposed in the vicinity of the first outer track groove 20a, is not shown in FIG. 3.

Figure 4:
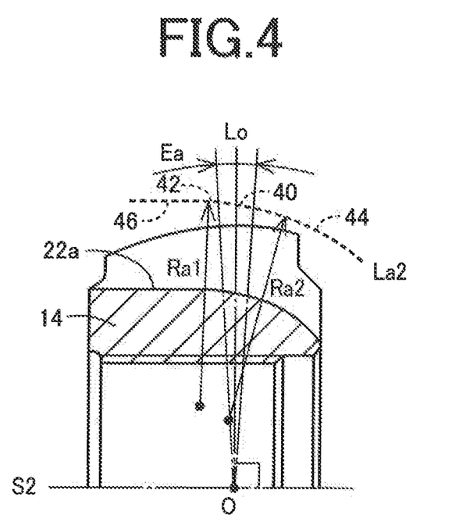
FIG. 4 is a cross sectional view of an inner joint member of the constant-velocity universal joint of FIG. 1, particularly, a portion of a first inner track groove of the inner joint member, for explaining a shape of a bottom of the first inner track groove in its longitudinal direction.

FIG. 4 is a view for specifically explaining a shape of a bottom of the first inner track groove 22a in the axial cross section. The shape of the bottom of the first inner track groove 22a is dependent on a ball locus La2 that is indicated by broken line. The ball locus La2 is a mirror image of the ball locus La1, namely, is symmetrical to the ball locus La1 with respect to the perpendicular line Lo, and is the same as the ball locus La1 in that the ball locus La2 includes the inclined straight portion 40, arcuate portions 42, 44 and parallel straight portion 46. The inclined straight portion 40 corresponds to the normal region Ea. The arcuate portions 42, 44 are smoothly connected to respective opposite ends of the inclined straight portion 40, and have respective radii Ra1, Ra2. The parallel straight portion 46 is parallel with the centerline S2, and is smoothly connected to one of opposite ends of the arcuate portion 42, which is on left side in FIG. 4, namely, which is on the side of the bottom wall of the cup-shaped outer joint member 12. The inclined straight portion 40 of the ball locus La2 is inclined radially inwardly by about 11 degrees corresponding to $\alpha/2$ such that the inclined straight portion 40 becomes closer to the centerline S2 in a rightward direction as seen in FIG. 4, i.e., in a direction toward the opening end of the cup-shaped outer joint member 12. The bottom of the first inner track groove 22a has a radial dimension that is smaller than the ball locus La2 by the radius of the ball 24.

Figure 5:
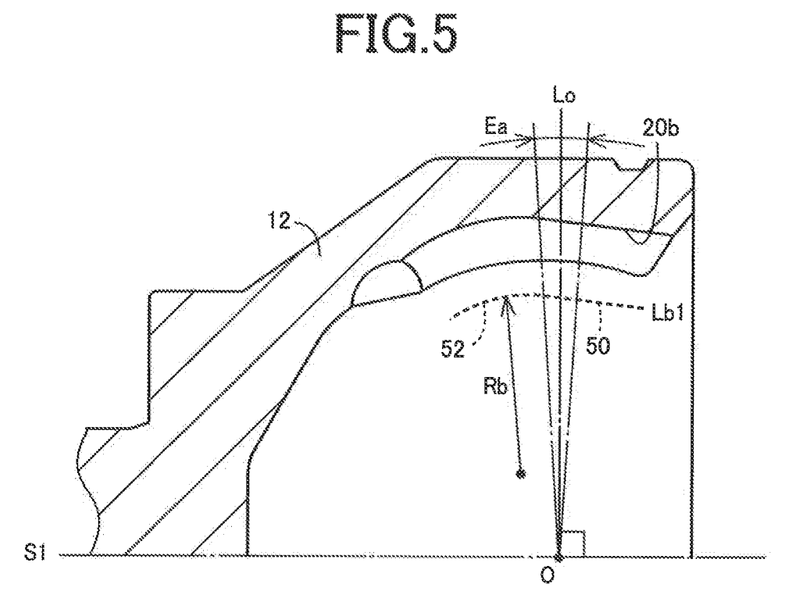
FIG. 5 is a cross sectional view of the outer joint member of the constant-velocity universal joint of FIG. 1, particularly, a portion of a second outer track groove of the outer joint member, for explaining a shape of a bottom of the second outer track groove in its longitudinal direction.

FIG. 5 is a view for specifically explaining a shape of the bottom of the second outer track groove 20b in the axial cross section. In FIG. 5, broken line indicates a ball locus Lb1 that is a movement path along which a center of the ball 24 is to be moved. The shape of the bottom of the second outer track groove 20b is dependent on the ball locus Lb1. The ball locus Lb1 includes an inclined straight portion 50 and an arcuate portion 52. The inclined straight portion 50 includes the above-described normal region Ea. The arcuate portion 52 has a radius Rb, and is smoothly connected to a left side end, as seen in FIG. 5, of the inclined straight portion 50, namely, to one of opposite ends of the inclined straight portion 50 wherein the one of the opposite ends is located between the normal region Ea and the bottom wall of the cup-shaped outer joint member 12. The inclined straight portion 50 includes, in addition to the normal region Ea, an extension region that is located on a right side end, as seen in FIG. 5, of the normal region Ea, namely, on one of opposite sides of the normal region Ea wherein the one of the opposite sides is a side of the opening end of the cup-shaped outer joint member 12. The inclined straight portion 50 defines the pinch angle $\beta$ in the reference state in which the joint angle $\Phi$ is 0 degree. In the present embodiment, the inclined straight portion 50 is inclined radially inwardly by about 7 degrees corresponding to an absolute value of $\beta/2$ (i.e., a half of the pinch angle $\beta$) such that the inclined straight portion 50 becomes closer to the centerline S2 in a direction toward the opening end of the cup-shaped outer joint member 12. The radius Rb of the arcuate portion 52 is smaller than a radial distance of the ball locus Lb1 from the centerline S1. The bottom of the second outer track groove 20b has a radial dimension that is larger than the ball locus La1 by the radius of the ball 24. It is noted that the first outer track groove 20a, which is disposed in the vicinity of the second outer track groove 20b, is not shown in FIG. 5.

Figure 6:
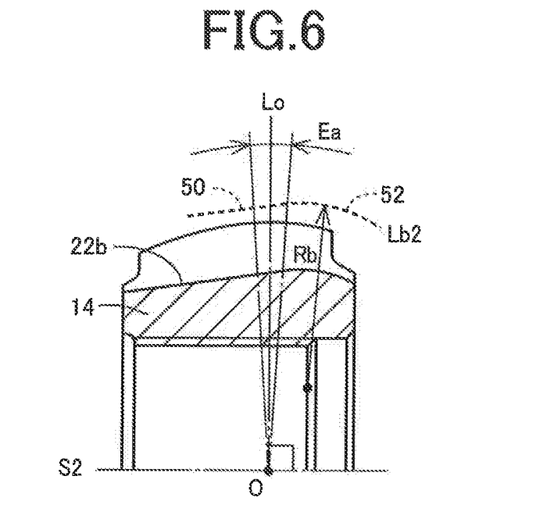
FIG. 6 is a cross sectional view of the inner joint member of the constant-velocity universal joint of FIG. 1, particularly, a portion of a second inner track groove of the inner joint member, for explaining a shape of a bottom of the second inner track groove in its longitudinal direction.

FIG. 6 is a view for specifically explaining a shape of the bottom of the second inner track groove 22b in the axial cross section. The shape of the bottom of the second inner track groove 22b is dependent on a ball locus Lb2 that is indicated by broken line. The ball locus Lb2 is a mirror image of the ball locus Lb1, namely, is symmetrical to the ball locus Lb1 with respect to the perpendicular line Lo, and is the same as the ball locus Lb1 in that the ball locus Lb2 includes the inclined straight portion 50 and the arcuate portion 52. The inclined straight portion 50 includes the above-described normal region Ea. The arcuate portion 52 has the radius Rb, and is smoothly connected to a right side end, as seen in FIG. 6, of the inclined straight portion 50, namely, to one of opposite ends of the inclined straight portion 50 wherein the one of the opposite ends is located between the normal region Ea and the opening end of the cup-shaped outer joint member 12. The inclined straight portion 50 includes, in addition to the normal region Ea, an extension region that is located on a left side end, as seen in FIG. 6, of the normal region Ea, namely, on one of opposite sides of the normal region Ea wherein the one of the opposite sides is a side of the bottom wall of the cup-shaped outer joint member 12. The inclined straight portion 50 of the ball locus Lb2 is inclined radially outwardly by about 7 degrees corresponding to $\beta/2$ such that the inclined straight portion 50 becomes more distant from the centerline S2 in a rightward direction as seen in FIG. 6, i.e., in a direction toward the opening end of the cup-shaped outer joint member 12. The bottom of the second inner track groove 22b has a radial dimension that is smaller than the ball locus Lb2 by the radius of the ball 24.

FIG. 7 is a view for explaining a pressing force Fa applied to the ball 24 (A1), based on the pinch angle $\alpha$ in the first groove portion 30, and a pressing force Fb applied to the ball 24 (B4), based on the pinch angle $\beta$ in the second groove portion 32, in the constant-velocity universal joint of FIG. 1. For distinguishing the six balls 24 from one another, as shown in FIG. 8, three balls 24 disposed in the respective first groove portions 30 will be referred to as balls A1, A3, A5, and other three balls 24 disposed in the respective second groove portions 32 will be referred to as balls B2, B4, B6. The six balls 24 will be referred to as balls A, B or balls 24 where they are not be particularly distinguished from one another. As shown in FIG. 7, the ball A1 disposed in the first groove portion 30 receives the pressing force Fa which is based on the pinch angle $\alpha$ and acts in rightward direction, while the ball B4 disposed in the second groove portion 32 receives the pressing force Fb which is based on the pinch angle $\beta$ and acts in the leftward direction. When the joint angle $\Phi$ is to be changed, namely, when the constant-velocity universal joint 10 is to be bent or to be returned from being bent, the balls 24 are moved based on the pressing forces Fa, Fb whereby the cage 26 is pivoted about the joint center O. Specifically, when the shaft 16 of the inner joint member 14 is to be pivoted downwardly as indicated by arrow Dn, relative to the outer joint member 12, within a plane (corresponding to drawing sheet of FIG. 7) containing the centers of the respective balls A1, B4, namely, about a pivot axis perpendicular to the plane containing the centers of the respective balls A1, B4, the cage 26 is smoothly pivoted about the joint center O owing to movements of the balls 24 based on the pressing forces Fa, Fb. On the other hand, when the shaft 16 of the inner joint member 14 is to be pivoted upwardly as indicated by arrow Up relative to the outer joint member 12 within the above-described plane, the cage 26 has to be pivoted about the joint center O in counterclockwise direction as seen in FIG. 7. However, in this instance, the pressing forces Fa, Fb applied to the respective balls A1, B4 act in a direction opposite to the counterclockwise direction, so that the pressing forces Fa, Fb do not contribute to the pivot movement of the cage 26 in the counterclockwise direction.

When the joint angle $\Phi$ is changed, the pinch angles $\alpha$, $\beta$ are changed with the change of the joint angle $\Phi$, and the pressing forces Fa, Fb are also changed with the changes of the pinch angles $\alpha$, $\beta$. Further, it is necessary to study a magnitude and a direction of each of the pressing forces Fa, Fb which is based on a corresponding one of the pinch angles $\alpha$, $\beta$ of a corresponding one of all of the six balls A1, A3, A5, B2, B4, B6. FIG. 9 is a view showing characteristics of the changes of the pinch angles $\alpha$, $\beta$ of the six balls A1, A3, A5, B2, B4, B6, which are caused depending on the joint angle $\Phi$, when the inner joint member 14 is pivoted relative to the outer joint member 12 upwardly and downwardly within a plane containing the centers of the respective balls A1, B4. When the shaft 16 of the inner joint member 14 is pivoted upwardly (toward the ball A1), the joint angle Φ takes a positive value, for example, Φ=46 degrees in a case shown in right-side view of FIG. 8. When the shaft 16 of the inner joint member 14 is pivoted downwardly (toward the ball B4), the joint angle Φ takes a negative value, for example, Φ=−46 degrees in a case shown in left-side view of FIG. 8. When the shaft 16 of the inner joint member 14 is pivoted upwardly (joint angle Φ>0) as indicated by arrow Up in FIG. 7, a value of the pinch angle β of the ball B6 located on an upper side of the centerline S1 is negative in an entire range of Φ>0, and a value of the pinch angle α of the ball A3 located on a lower side of the centerline S1 is positive in the entire range of Φ>0, as shown in FIG. 9, so that the cage 26 is smoothly pivoted in counterclockwise direction with the balls B6, A3 being moved by the pressing forces Fb, Fa applied to the balls B6, A3.

There will be described an issue in the conventional constant-velocity universal joint 90 in which the pinch angle α is 14 degrees in the first groove portion 30 and the pinch angle β is −14 degrees in the second groove portion 32 in the reference state with the joint angle Φ being 0 degree, specifically, an issue relating to the pressing forces Fa, Fb in the vicinity of the joint angle Φ of 20 degrees during change of the joint angle Φ when the joint 90 is to be returned to the reference state after the shaft 16 of the inner joint member 14 has been pivoted upwardly. As is apparent from FIG. 9, the constant-velocity universal joint 10 according to the embodiment of the present invention is the same as the conventional constant-velocity universal joint 90 in that (i) the pinch angle α of the ball A1 as one of the balls A1, B2, B6 located on an upper side of the centerline S1 takes a positive value, (ii) the pinch angles β of the respective balls B2, B6 as the others of the balls A1, B2, B6 located on the upper side both take negative values, and (iii) the pinch angles α, β of the balls A3, A5, B4 located on a lower side of the centerline S1 all take positive values. That is, the constant-velocity universal joint 10 is the same as the conventional constant-velocity universal joint 90 in that only the ball A1 contributes to the pivot movement of the cage 26. However, in the constant-velocity universal joint 10, the pinch angle α of the ball A1 is about 20 degrees, and is much larger than that (not larger than 10 degrees as shown in FIG. 16) in the conventional constant-velocity universal joint 90. Therefore, in the constant-velocity universal joint 10, the ball A1 is pressed to be moved by the large pressing force Fa based on the large pinch angle α, whereby the cage 26 can be smoothly pivoted in the clockwise direction about the joint center O.

Figure 10:
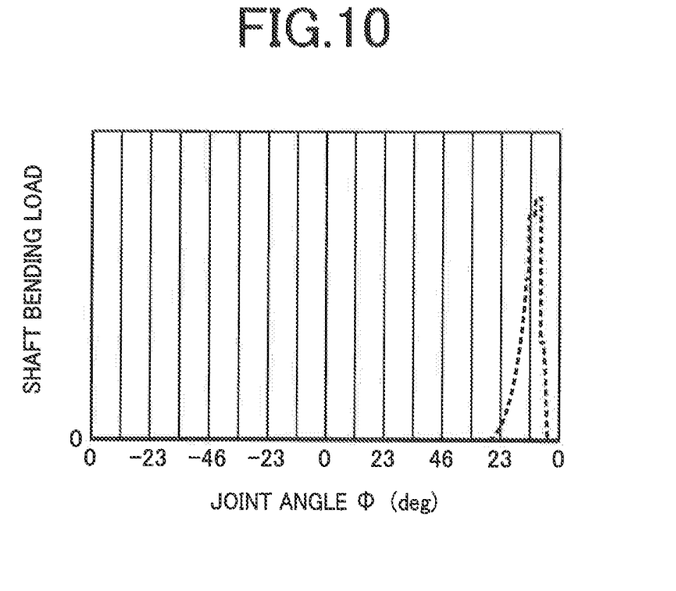
FIG. 10 is a view showing change (solid line) of a shaft bending load generated in the constant-velocity universal joint of FIG. 1 when it is returned from being bent, as shown in FIG. 8, as compared with that (broken line) in a conventional constant-velocity universal joint in which absolute values of the pinch angles $\alpha$, $\beta$ are equal to with each other.

FIG. 10 is a graph of change of a shaft bending load generated in the constant-velocity universal joint 10 when the joint angle Φ is changed within a range of ±46 degrees as shown in FIG. 8. In the present embodiment, the shaft bending load is substantially zero throughout the entire range of the joint angle Φ, as indicated by solid line in FIG. 10. On the other hand, in FIG. 10, broken line indicates change of a shaft bending load generated in the conventional constant-velocity universal joint 90 shown in FIGS. 15 and 16. In the conventional constant-velocity universal joint 90, where the joint is returned to the reference state from being bent by +46 degrees, the shaft bending load is abruptly increased when the joint angle Φ becomes not larger than 20 degrees. Thus, in the conventional constant-velocity universal joint 90, it is not possible to appropriately obtain an effect by the pinch angles α, β to pivot the cage 26, and it is considered that resistance to pivot movement of the cage 26 is large.

Figure 11:
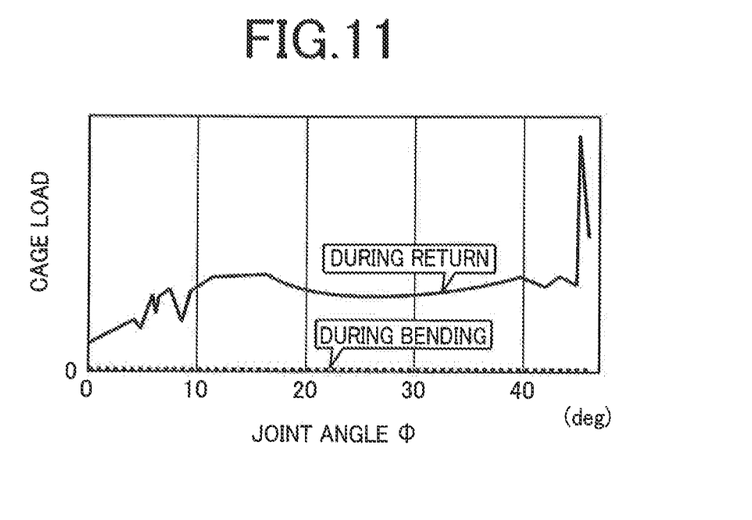
FIG. 11 is a view showing change of a load acting between the ball A1 and a cage, wherein broken line indicates the change of the load when the constant-velocity universal joint of FIG. 1 is bent upwardly (toward the first groove portion) as shown in right-side view of FIG. 8, and solid line indicates the change of the load when the joint of FIG. 1 is returned after having been bent upwardly.
Figure 17:
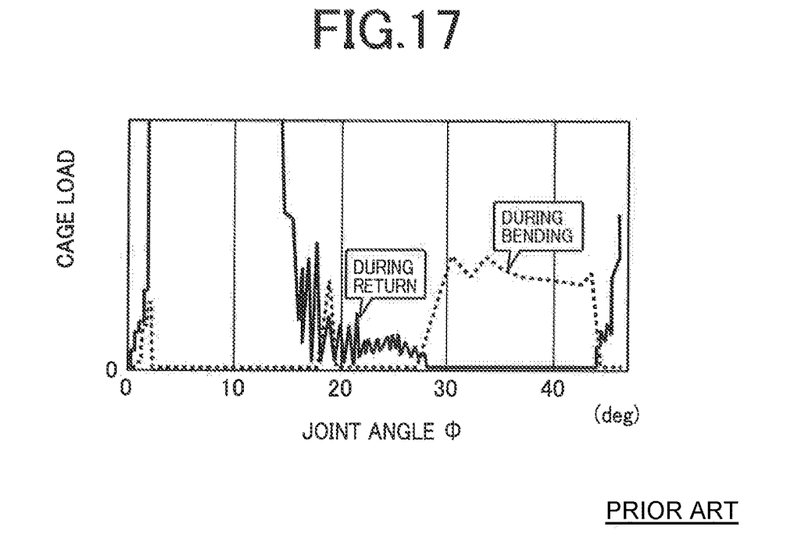
FIG. 17 is a view corresponding to FIG. 11 that relates to the constant-velocity universal joint (as the embodiment of the invention) of FIG. 1, and showing change of a load acting between the ball A1 and the cage, wherein broken line indicates the change of the load when the conventional constant-velocity universal joint of FIG. 15 is bent upwardly (toward the first groove portion) as shown in the right-side view of FIG. 8, and solid line indicates the change of the load when the joint of FIG. 15 is returned after having been bent upwardly.

FIG. 11 is a graph showing change of a cage load acting between the ball A1 and the cage 26, wherein broken line indicates the change of the cage load when the constant-velocity universal joint 10 is bent to +46 degrees of the joint angle Φ, and solid line indicates the change of the cage load when the joint 10 is returned to the reference state from +46 degrees of the joint angle Φ. When the joint 10 is being bent, the cage load is substantially zero so that the ball A1 does not contribute to the pivot movement of the cage 26. However, when the joint 10 is being returned to the reference state, a certain amount of load is applied to the cage 26 from an initial stage of the return, so that it is considered that the cage 26 can be smoothly pivoted about the joint center O in the clockwise direction, owing to the cage load. On the other hand, in the conventional constant-velocity universal joint 90 shown in FIGS. 15 and 16, the cage load is substantially zero in an initial stage of the return (in which the joint angle Φ is between about 30-40 degrees), as shown in FIG. 17, so that the ball A1 does not contribute to the cage 26. Further, in the conventional constant-velocity universal joint 90, when the joint angle Φ becomes not larger than 20 degrees, the cage load acting between the cage 26 and the ball A1 is increased considerably. It is considered that the considerable increase of the cage load acting between the cage 26 and the ball A1 is caused as a result of returning operation of the shaft 16 of the inner joint member 14; which is made to forcibly pivot the cage 26.

Figure 12:
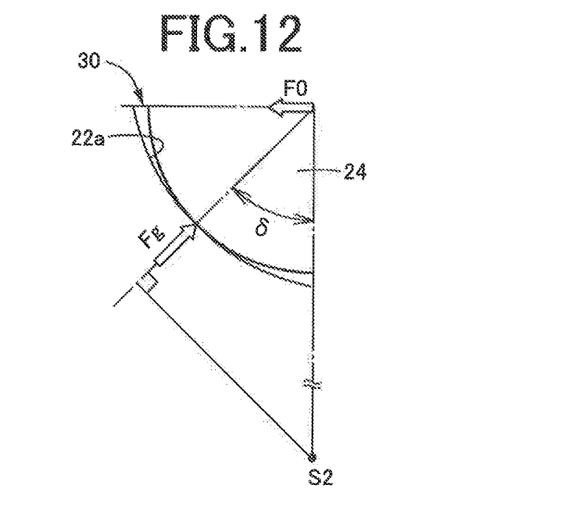
FIG. 12 is a view for explaining a ball-groove load Fg applied from the ball to the inner track groove in the first groove portion when rotation is transmitted through the constant-velocity universal joint.
Figure 13:
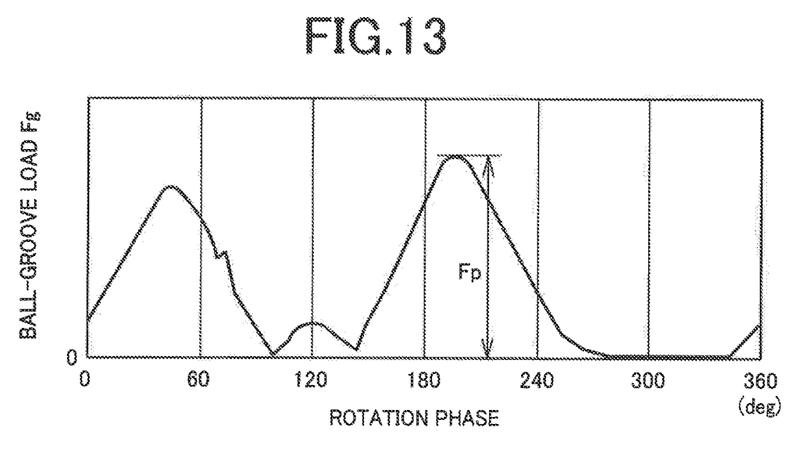
FIG. 13 is a view showing characteristic of change of the ball-groove load Fg shown in FIG. 12, and explaining a peak value Fp of the ball-groove load Fg that is obtained from the characteristic of the change of the ball-groove load Fg.
Figure 14:
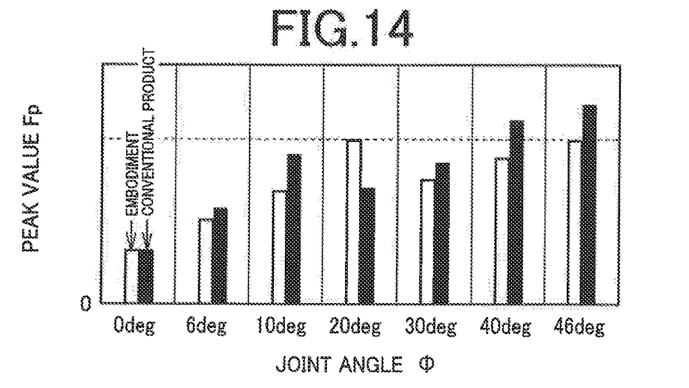
FIG. 14 is a view showing the peak value Fp of the ball-groove load Fg in each of various values of joint angle $\Phi$, in a comparative manner comparing the constant-velocity universal joint (as the embodiment of the invention) of FIG. 1 and the conventional constant-velocity universal joint in which the absolute values of the pinch angles $\alpha$, $\beta$ are equal to with each other.

FIG. 12 is a view for explaining a ball-groove load Fg applied between the ball 24 and the first inner track groove 22a in the first groove portion 30 when rotation is transmitted from the outer joint member 12 to the inner joint member 14. In this case, the ball-groove load Fg is expressed by equation (1) using a contact angle δ and a load F0 of the ball 24, wherein the contact angle δ is changed depending on the rotational phase and the joint angle Φ. FIG. 13 is a graph showing characteristic of change of the ball-groove load Fg during one rotation of the constant-velocity universal joint 10 with the joint angle Φ being held at a certain angle value. As shown in FIG. 13, the load Fg is increased to a peak value Fp at a certain rotational phase. FIG. 14 is a view showing the peak value Fp in each of various values of joint angle Φ, in a comparative manner comparing the constant-velocity universal joint 10 and the conventional constant-velocity universal joint, by using a bar graph. As shown in FIG. 14, in the constant-velocity universal joint 10 according to the present embodiment, the peak value Fp is maximized when the joint angle Φ is 20 degrees or 46 degrees, but is smaller than a maximum value of the peak value Fp in the conventional constant-velocity universal joint. Thus, in the constant-velocity universal joint 10 according to the present embodiment, the maximum value of the ball-groove load Fg is made lower whereby the durability is improved, and a required length is reduced thereby making it possible to reduce the constant-velocity universal joint in the radial dimension.

$$Fg = F0/\sin \delta \qquad (1)$$

As described above, in the constant-velocity universal joint 10 according to the present embodiment, the absolute value of the pinch angle α of the first groove portions 30 is larger than the absolute value of the pinch angle β of the second groove portions 32 in the reference state, so that the pressing force Fa applied to the balls 24 by the pinch angle α in the first groove portions 30 is made large. Therefore, even in a range of the joint angle Φ in which a sufficiently large pressing force Fa cannot be obtained by the pinch angle α in the first groove portions 30 in a conventional constant-velocity universal joint, for example, a range including about 20 degrees and larger than 20 degrees during return from being bent toward +46 degrees, the pressing force Fa applied to the ball 24 (A1) is made sufficiently large whereby the cage 26 can be smoothly pivoted by movement of the ball 24 (A1) by the pressing force Fa applied to the ball 24 (A1).

Further, the absolute value of the pinch angle α in the first groove portions 30 is larger than the absolute value of the pinch angle β in the second groove portions 32 by a range from 2 degrees to 10 degrees in the reference state. Therefore, the pressing force Fa applied to the balls 24 in the first groove portions 30 is made reliably large whereby the cage 26 can be appropriately pivoted by movement of the balls 24 by the pressing force Fa applied to the balls 24.

Further, when the constant-velocity universal joint 10 is bent within the plane containing one of the first groove portions 30, the pinch angle α in the one of the first groove portions 30 is maintained irrespective of the joint angle Φ, such that the value of the pinch angle α in the one of the first groove portions 30 is positive, namely, the radial distance between a corresponding one of the outer track grooves 20a and a corresponding one of the inner track grooves 22a in the radial direction is generally increased in the direction toward the opening end of the outer joint member 12, and such that the absolute value of the pinch angle α in the one of the first groove portions 30 is larger than the absolute value (14 degrees) of the pinch angle β in the second groove portions 32 in the reference state. Thus, irrespective of the joint angle Φ, namely, throughout an entire range of the joint angle Φ, the pressing force Fa applied to the ball 24 by the pinch angle α in the above-described one of the first groove portions 30 is maintained relatively large. Therefore, the cage 26 can be smoothly pivoted by movement of the ball 24 by the pressing force Fa depending on a bending direction.

Further, each of the outer track grooves 20a, 20b of the first and second groove portions 30, 32 has the bottom that includes a straight portion defined by a straight line in the axial cross section, and the outer contact point lies in the straight portion (corresponding to the inclined straight portion 40 or inclined straight portion 50 of the ball locus La1 or ball locus Lb1) of the bottom of each of the outer track grooves 20a, 20b at least in the normal region Ea, namely, at least when the joint angle Φ is not larger than 7 degrees. Similarly, each of the inner track grooves 22a, 22b of the first and second groove portions 30, 32 has the bottom that includes a straight portion defined by a straight line in the axial cross section, and the inner contact point lies in the straight portion (corresponding to the inclined straight portion 40 or inclined straight portion 50 of the ball locus La2 or ball locus Lb2) of the bottom of each of the inner track grooves 22a, 22b at least in the normal region Ea. Therefore, a portion of each of the track grooves 20a, 20b, 22a, 22b, which corresponds to the normal region Ea, can be machined easily with a high accuracy so that it is possible to appropriately obtain the pressing forces Fa, Fb depending on the pinch angles α, β.

While the preferred embodiment of this invention has been described in detail by reference to the drawings, it is to be understood that the embodiment described above is given for illustrative purpose only, and that the present invention may be embodied with various modifications and improvements which may occur to those skilled in the art.

NOMENCLATURE OF ELEMENTS

10: constant-velocity universal joint
12: outer joint member
14: inner joint member
20a: outer track groove
20b: outer track groove
22a: inner track groove
22b: inner track groove
24: ball
A1, A3, A5, B2, B4, B6: balls
26: cage
28: pocket
30: first groove portion
32: second groove portion
40, 50: inclined straight portion
S1: centerline of the outer joint member
S2: centerline of the inner joint member
Φ: joint angle
α: pinch angle of the first groove portion
β: pinch angle of the second groove portion
Ea: normal region (small bending region)

What is claimed is:
1. A constant-velocity universal joint comprising:
a generally cup-shaped outer joint member having a plurality of outer track grooves provided in an inner circumferential surface thereof;
an inner joint member having a plurality of inner track grooves provided in an outer circumferential surface thereof, said inner joint member being disposed inside said outer joint member;
a plurality of balls interposed between said outer track grooves and said inner track grooves, so as to transmit a torque between said outer joint member and said inner joint member; and
a generally annular-shaped cage disposed between said outer joint member and said inner joint member, and having a plurality of pockets holding therein said balls,
wherein said outer track grooves and said inner track grooves cooperate to define a plurality groove portions, such that each of said balls is disposed in a corresponding one of said groove portions,
wherein each of said balls, which is disposed in a corresponding one of said groove portions, is pinched between one of said outer track grooves and one of said inner track grooves that cooperate to define said corresponding one of said groove portions, and is in contact at outer and inner contact points with said one of said outer track grooves and said one of said inner track grooves, respectively,
wherein an outer tangent plane that is tangent to each of said balls at said outer contact point and an inner tangent plane that is tangent to each of said balls at said inner contact point cooperate with each other to define a pinch angle at an intersection of said outer tangent plane and said inner tangent plane,
wherein said groove portions include three first groove portions in which a radial distance between a corresponding one of said outer track grooves and a corresponding one of said inner track grooves in a radial direction of said outer joint member is generally increased in a direction toward an opening end of said outer joint member in a reference state in which centerlines of said outer joint member and said inner joint member lie in a straight line with a joint angle defined by said centerlines being zero degrees,
wherein said groove portions include three second groove portions in which a radial distance between a corresponding one of said outer track grooves and a corresponding one of said inner track grooves in said radial direction is generally reduced in said direction toward said opening end of said outer joint member in said reference state, wherein, in said reference state, said three first groove portions and said three second groove portions are alternately arranged about said centerlines, and each of said three first groove portions and a corresponding one of said three second groove portions are located in respective positions that are symmetrical with respect to said centerlines, wherein, in said reference state, an absolute value of said pinch angle in said three first groove portions is larger than an absolute value of said pinch angle in said three second groove portions, wherein each of said outer track grooves of said three second groove portions has a bottom that includes a straight portion defined by a straight line in a cross section containing said centerline of said outer joint member, and wherein each of said inner track grooves and said three second groove portions has a bottom that includes a straight portion defined by a straight line in a cross section containing said centerline of said inner joint member.

2. The constant-velocity universal joint according to claim 1, wherein, in said reference state, said absolute value of said pinch angle in said three first groove portions is larger than said absolute value of said pinch angle in said three second groove portions by a range from two degrees to ten degrees.

3. The constant-velocity universal joint according to claim 1, wherein, when said constant-velocity universal joint is bent within a plane containing one of said three first groove portions, said pinch angle in said one of said three first groove portions is maintained irrespective of said joint angle such that said radial distance in said one of said three first groove portions is generally increased in said direction toward said opening end of said outer joint member and such that said absolute value of said pinch angle in said one of said three first groove portions is larger than said absolute value of said pinch angle in said three second groove portions in said reference state.

4. The constant-velocity universal joint according to claim 1, wherein each of said outer track grooves of said at least one first groove portion has a bottom that includes a straight portion defined by a straight line in a cross section containing said centerline of said outer joint member, wherein said outer contact point lies in said straight portion of said bottom of each of said outer track grooves at least when said joint angle is not larger than five degrees, wherein said inner contact point lies in said straight portion of said bottom of each of said inner track grooves at least when said joint angle is not larger than five degrees.

5. The constant-velocity universal joint according to claim 1, wherein a total number of said groove portions is six.

6. The constant-velocity universal joint according to claim 1, wherein said outer contact point lies in said straight portion of said bottom of each of said outer track grooves of said three second groove portion at least when said joint angle is not larger than 5 degrees, and wherein said inner contact point lies in said straight portion of said bottom of each of said inner track grooves of said three second groove portion at least when said joint angle is not larger than 5 degrees.

7. The constant-velocity universal joint according to claim 1, wherein each of said outer track grooves of said three first groove portion has a bottom that includes straight portion defined by a straight line in a cross section containing said centerline of said outer joint member, and wherein each of said inner track grooves of said three first groove portion has a bottom that includes a straight portion defined by a straight line in a cross section containing said centerline of said outer joint member.

8. The constant-velocity universal joint according to claim 1, wherein said outer contact point lies in said straight portion of said bottom of each of said outer track grooves of said three first groove portion at least when said joint angle is not larger than 5 degrees, and wherein said inner contact point lies in said straight portion of said bottom of each of said inner track grooves of said three first groove portion at least when said joint angle is not larger than 5 degrees.

* * * * *